United States Patent [19]

Watanabe et al.

[11] 4,214,191
[45] Jul. 22, 1980

[54] SYSTEM FOR AUTOMATIC MANAGEMENT OF TOOL LIFE

[75] Inventors: Toshiaki Watanabe; Hideo Yuhara, both of Kasugai, Japan

[73] Assignee: Okuma Machinery Works Ltd., Nagoya, Japan

[21] Appl. No.: 835,362

[22] Filed: Sep. 21, 1977

[30] Foreign Application Priority Data

Sep. 29, 1976 [JP] Japan .................... 51/117433

[51] Int. Cl.² .................................. G05B 13/00
[52] U.S. Cl. .................... 318/561; 318/572; 29/568; 318/634
[58] Field of Search .................. 318/561, 572, 634; 73/104; 29/568

[56] References Cited

U.S. PATENT DOCUMENTS

| 3,594,563 | 7/1971 | Bishop | 318/572 |
| 3,605,531 | 9/1971 | Izumi et al. | 318/634 |
| 3,783,253 | 1/1974 | Anderson et al. | 318/572 |
| 4,061,952 | 12/1977 | Dinsdale et al. | 318/572 |

Primary Examiner—Gene Z. Rubinson
Assistant Examiner—Eugene S. Indyk
Attorney, Agent, or Firm—Norbert P. Holler; Charles A. Blank

[57] ABSTRACT

A system for the automatic management (detection and control) of tool life in a numerically controlled machine tool having means for automatically measuring the dimension of workpieces and correcting the tool offset of a cutting tool depending on wear on the cutting tool. In the system, the mechanical deformation error component (radial deviation component of a spindle of the machine tool) due to heat is removed from the amount of tool offset value (tool feed position compensation) so as to accumulate solely the net tool wear component, and the cutting tool is exchanged when the accumulated value attains a predetermined setting.

4 Claims, 6 Drawing Figures

SYSTEM FOR AUTOMATIC MANAGEMENT OF TOOL LIFE

BACKGROUND OF THE INVENTION

1. Field of the Invention

This invention relates to a system for use in a machine tool for the automatic management or control of tool life.

2. Description of the Prior Art

Numerically or otherwise controlled machine tools having a system including a measuring unit have been proposed hitherto and put into practical use, in which such a system is used for automatically measuring the dimension of workpieces and correcting the tool offset of a cutting tool depending on wear on the cutting tool. However, the amount of tool feed position compensation includes the error component (radial deviation component of a spindle of a machine tool) due to mechanical deformation resulting from temperature rise of the machine tool, in addition to the component related to tool wear, and the proportion of the former component with respect to the latter component in the amount of tool offset or tool feed position compensation is too high to be negligible. Especially, in the starting stage of the cutting operation of the machine tool, the component related to tool wear is almost negligible compared with the error component, as defined above, due to mechanical deformation resulting from temperature rise of the machine tool, and in such a stage, this error component occupies almost the entirety of the amount of tool offset or tool feed position compensation. The prior art system has therefore been defective in that detection and accumulation of the net component related solely to tool wear is difficult, and thus, detection and control of tool life cannot be attained with desired high precision.

SUMMARY OF THE INVENTION

It is a primary object of the present invention to separate the net component related to tool wear from the error component due to mechanical deformation resulting from temperature rise of a machine tool, so that management of tool life can be rationally attained with high precision to permit continuous automatic operation of the machine tool over an extended period of time.

The present invention provides a system for the automatic management of tool life in a machine tool, in which the mechanical deformation error component, as defined above, due to heat is removed from the measured amount of tool offset or tool feed position compensation so as to solely accumulate the net actual tool wear component, and the cutting tool is exchanged when the accumulated value attains a predetermined setting.

DESCRIPTION OF THE PREFERRED EMBODIMENTS

Preferred embodiments of the present invention will now be described in detail with reference to the drawings.

Figure 1:
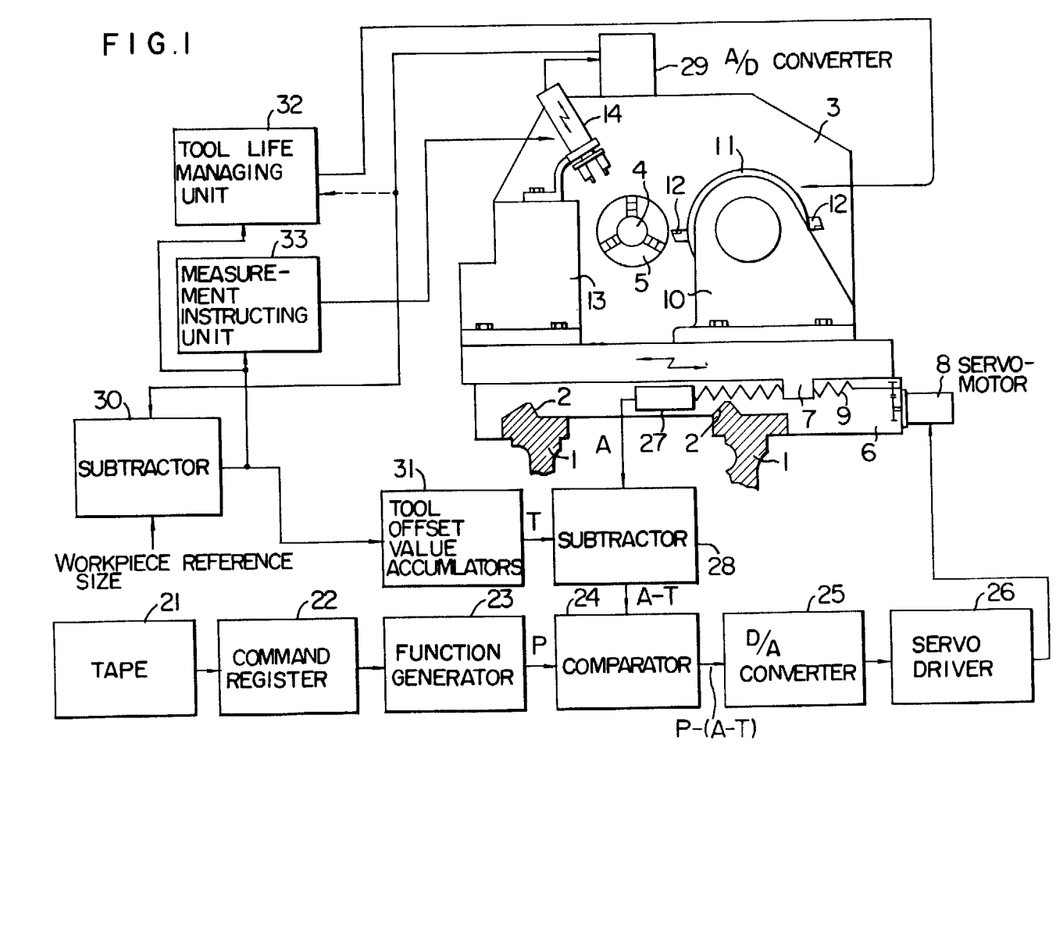
FIG. 1 is a control block diagram of a preferred embodiment of the automatic tool life management system according to the present invention.

FIG. 1 is a control block diagram of a preferred embodiment of the tool life management system according to the present invention. Referring to FIG. 1, a machine tool to which the present invention is applied includes a bed 1 which is formed on its upper surface with a pair of parallel guideways 2 extending in a horizontal longitudinal direction or in a direction of the Z-axis. A headstock 3 is fixedly mounted on one end portion of the bed 1 to rotatably support a main spindle having its axis extending in the direction of the Z-axis, and a chuck 5 for releasebly grasping a workpiece 4 is mounted on the front end of the main spindle. A carriage 6 is mounted on the bed 1 so as to be slidable in the direction of the Z-axis along the guideways 2 and is formed on its upper surface with guideways (not shown) extending in a horizontal direction normal to the guideways 2 or in a direction of the X-axis normal to the Z-axis. A cross slide (saddle) 7 is mounted on the carriage 6 so as to be slidable along the guideways extending in the direction of the X-axis, and a servo-motor 8 mounted on a side surface of the carriage 6 is connected through a gear train to a feed screw 9 for causing traveling movement of the cross slide 7 in the direction of the X-axis. A tool post 10 is fixedly mounted on the upper surface of the cross slide 7 on the rear side of the workpiece 4 and has a turret head 11 mounted on the side opposite to the headstock 3. The turret head 11 has a swivel axis extending in the direction of the Z-axis, and means are provided for turning the turret head 11 around the above axis and indexing the turret head 11 in one of a plurality of predetermined angular positions, so that the turret head 11 can be turned to be indexed in one of the predetermined angular positions. A plurality of cutting tools 12 of the same shape are detachably fixed to the outer periphery of the turret head 11 such that they are equally circumferentially spaced apart from each other with their cutting edges oriented to the same direction and with their projecting ends disposed on the same circumference. Thus, these cutting tools 12 can be sequentially indexed to be positioned in the working or cutting position with the turning movement of the turret head 11 around the swivel axis. A supporting member 13 is fixedly mounted on the upper surface of the cross slide 7 on the front side of the workpiece 4 to support thereon a measuring unit 14. This measuring unit 14 is advanced by a built-in fluid cylinder (not shown) toward the position of the workpiece 4 to measure the radius or radial dimension of the workpiece 4 grasped by the chuck 5 when the cross slide 7 and carriage 6 are positioned in the measuring position after the workpiece 4 has been machined.

The control section of the system of the present invention includes an input tape 21, a command register 22 for instructing the target position to which the cross slide 7 is finally advanced for carrying out cutting with the cutting tool 12, and a function generator 23 for generating a function P on the basis of the target position instructed by the command register 22. The output P of the function generator 23 is applied to a comparator 24 to be continuously compared with (A−T) where A is a position signal representing the physical and actual position of the cross slide 7 and T is an output of an accumulator 31 which will be described later. An output signal representing the difference given by P − (A − T) is applied from the comparator 24 to a D − A converter 25 to be converted into an analog voltage signal which is applied to a servo driver 26 which drives the servo-motor 8. The servo-motor 8 drives the feed screw 9 to cause sliding traveling movement of the cross slide 7. A position detector 27 is directly connected to the feed screw 9 to produce the output value A representing the physical position of the cross slide 7. The output value A is applied to a subtractor 28 in which the output value T of the tool offset value accumulator 31 described below is subtracted from the output value A. An A − D converter 29 converts the analog output value of the measuring unit 14 into a digital signal. The digital output signal of the A − D converter 29 obtained by the A − D conversion of the analog output signal of the measuring unit 14 is applied to a subtractor 30 to which a signal representing a predetermined standard dimension or reference size of the workpiece is also applied, so that the output of the subtractor 30 represents the deviation of the measured value from the predetermined standard radial dimension, and this deviation corresponds to the amount of tool offset or tool feed compensation. The output of the subtractor 30 is applied to the accumulator 31 to be accumulated therein, and the output value T representing the accumulated value is applied from the tool offset value accumulator 31 to the subtractor 28. The output value T of this accumulator 31 includes the amount of tool offset measured immediately after the cutting tool is set, in addition to the accumulated value of the amount of tool offset measured later. A plurality of such accumulators 31 may be generally provided. That is, such accumulators 31 may be provided by the number corresponding to that of the cutting tools 12 carried by the turret head 11 so that they may be suitably selected depending on the individual cutting tools 12 since the amount of tool offset in the initial stage of cutting with a new tool may be different depending on each individual cutting tool. The output value of the subtractor 30 is also applied to a tool life managing unit 32 in which the error component as defined above, due to the thermal deformation of the machine tool is subtracted from the amount of tool offset provided by the output signal of the subtractor 30, and the result of subtraction representing the net tool wear component is accumulated so that the cutting tool 12 is exchanged when the accumulated value attains a tool wear preset value. The output value of the subtractor 30 is also applied to a measurement instructing unit 33 which instructs the measuring timing by the measuring unit 14 on the basis of the above input and other input conditions.

Figure 2:
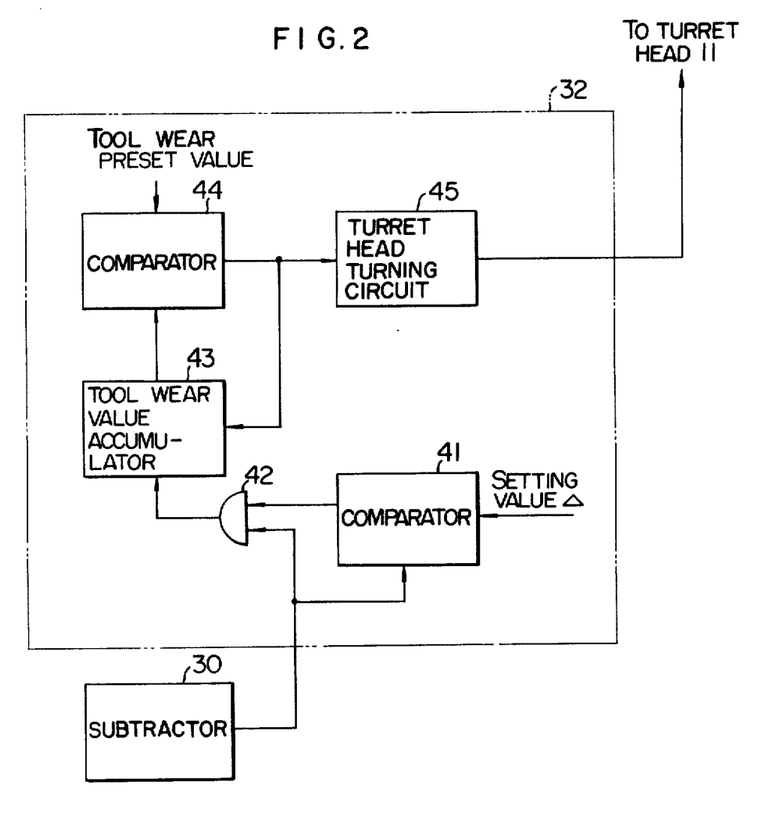
FIG. 2 is a block diagram showing in detail the structure of a first form of the tool life managing unit 32 in FIG. 1.

FIG. 2 is a block diagram showing in detail the structure of a first form of the tool life managing unit 32 shown in FIG. 1. Referring to FIG. 2, the output value of the subtractor 30 representing the amount of tool offset is compared with a value representing a certain predetermined reference setting value $\Delta$ in a comparator 41 in order to derive the net tool wear component from the amount of tool offset. The comparator 41 delivers its output value when the amount of tool offset is less than the setting value $\Delta$. The output signal of the subtractor 30 is permitted to pass through an AND gate 42 when the output appears from the comparator 41. The output value of the AND gate 42 is applied to a tool wear value accumulator 43 which accumulates the net tool wear component and is reset when the accumulated value attains a preset amount of wear. The output value of the accumulator 43 is applied to a comparator 44 to be compared with a value representing the preset amount of tool wear which requires exchange of the cutting tool 12 being used. A coincidence signal appears from the comparator 44 when coincidence is reached between these two inputs. This coincidence signal is applied to a turret head turning circuit 45 which actuates the drive unit incorporated in the tool post 10. Thus, the turret head 11 is turned to the next predetermined angular position to index the next cutting tool in the proper cutting position to prepare for cutting. All the used cutting tools 12 are replaced by new ones after those cutting tools have been used due to one complete turning movement of the turret head 11 around its swivel axis.

Figure 3:
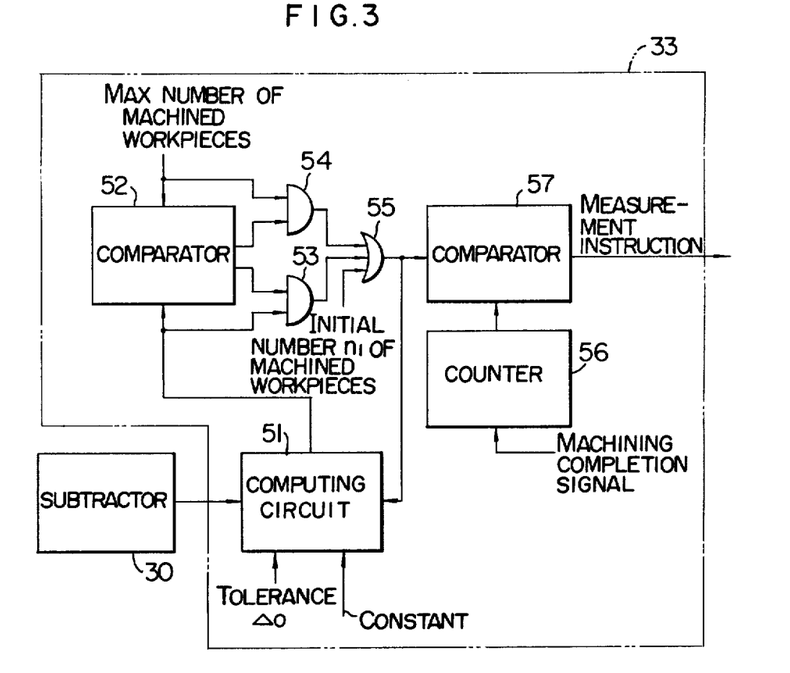
FIG. 3 is a block diagram showing in detail the structure of the measurement instructing unit 33 in FIG. 1.

FIG. 3 is a block diagram showing in detail the structure of one form of the measurement instructing unit 33 shown in FIG. 1. Referring to FIG. 3, the output signal of the subtractor 30 representing the amount of tool offset is applied to a computing circuit 51, together with a signal representing the (dimension) tolerance $\Delta_o$ of workpieces, a signal representing a constant (less than unity) used to be multiplied by the $\Delta_o$ in order to reduce the dimension tolerance $\Delta_o$, and a signal representing the number of workpieces machined up in each period of measurement. In response to the application of these inputs, the computing circuit 51 computes the number of workpieces to be machined in each measurement period. The output signal of the computing circuit 51 representing the number of workpieces to be machined during the above period of time is applied to a comparator 52 to be compared with a signal representing a preset maximum number of workpieces to be machined. When the former value is smaller than the latter value, the comparator 52 generates an output so that the output value of the computing circuit 51 is permitted to pass through an AND gate 53, while when the former value is larger than the latter value, the comparator 52 generates another output so that the signal representing the preset maximum number of workpieces to be machined is permitted to pass through another AND gate 54. The output of the AND gate 53 and the output of the AND gate 54 are connected to an OR gate 55 to which a signal representing the initial number $n_1$ of workpieces to be machined up to the time of first measurement is also connected. A counter 56 counts the number of machining completion pulses each of which is generated upon completion of machining on one workpiece. The output value of the OR gate 55 and the output value of the counter 56 are applied to a comparator 57 which applies a measurement instruction signal to the measuring unit 14 when the output value of the counter 56 coincides with that of the OR gate 55 representing the number of workpieces machined.

Figure 4:
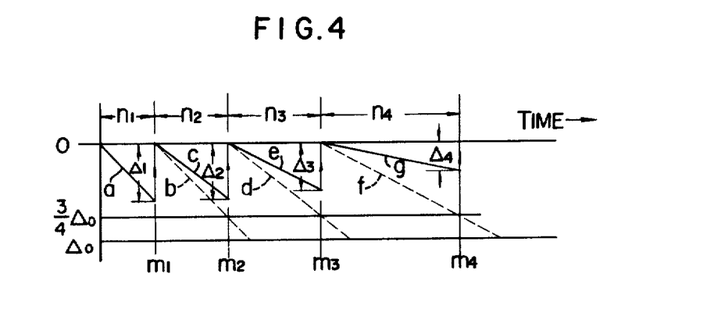
FIG. 4 is a timing chart illustrating the operation of the unit shown in FIG. 3.

The operation of the measurement instruction unit 33 shown in FIG. 3 will be described with reference to a timing chart of FIG. 4. In FIG. 4, the symbol $\Delta_o$ designates the dimension tolerance of workpieces, and $m_1$, $m_2$, $m_3$ and $m_4$ designate the times of measurement by the measuring unit 14. Symbols $n_1$, $n_2$, $n_3$ and $n_4$ designate the number of workpieces to be machined up to the respective times of measurement $m_1$, $m_2$, $m_3$ and $m_4$. Symbols $\Delta_1$, $\Delta_2$, $\Delta_3$ and $\Delta_4$ designate the amounts of tool offset up to the respective times of measurement $m_1$, $m_2$, $m_3$ and $m_4$, and these values are provided by the output value of the subtractor 30. Symbols a, c, e and g represent the ratios $$\frac{\Delta_1}{n_1}, \frac{\Delta_2}{n_2}, \frac{\Delta_3}{n_3} \text{ and } \frac{\Delta_4}{n_4},$$

respectively, that is, the lines indicating the actual amounts of tool offset relative to the instructed numbers of workpieces to be machined. The dotted lines b, d and f are parallel to the lines a, c and e respectively and represent the theoretical lines required for seeking the respective numbers $n_2$, $n_3$ and $n_4$ of workpieces to be machined. In FIG. 4, the value $\frac{3}{4}\Delta_o$ is shown so that the amount of tool offset can ensure machining of workpieces to within the dimension tolerance $\Delta_o$, and the number of times of measurement can be reduced to a minimum. However, such a value is in no way limited to $\frac{3}{4}\Delta_o$ and may be suitably selected within the range of, for example, $\frac{1}{2}\Delta_o$ to $\frac{3}{4}\Delta_o$. In FIG. 4, the initial number $n_1$ of workpieces to be machined up to the time $m_1$ of first measurement is previously commanded or instructed, and a relatively small number of workpieces, for example, five or ten is initially specified.

Referring to FIGS. 3 and 4, the signal representing the initial number $n_1$ of workpieces to be machined is applied through the OR gate 55 to the comparator 57, and the cutting operation is initiated. The number of machining completion pulses each appearing upon completion of machining on one workpiece is counted by the counter 56. When the count of the counter 56 attains $n_1$, the measurement instruction signal appears from the comparator 57 to be applied to the measuring unit 14. Upon completion of measurement by the measuring unit 14, the standard workpiece dimension is subtracted from the measured value in the subtractor 30, and the signal representing $\Delta_1$ appears from the subtractor 30 to be applied to the computing circuit 51. In response to the application of the above signal together with the output of the OR gate 55 representing the number $n_1$ of workpieces machined, the signal representing the dimension tolerance $\Delta_o$ and the signal representing the constant $\frac{3}{4}$, the computing circuit 51 computes the number $n_2$ of workpieces to be machined up to the time $m_2$ of next measurement. The output signal of the computing circuit 51 representing $n_2$ is applied to the comparator 52 to be compared with the value representing the preset maximum number of workpieces to be machined which may be one hundred. Since $n_2$ is smaller than the preset maximum, the signal representing $n_2$ passes through the AND gate 53 and OR gate 55 to be applied to the comparator 57. Machining is started again, and the measurement instruction signal instructing second measurement at time $m_2$ is applied from the comparator 57 to the measuring unit 14 when the count of the counter 56 attains $n_2$.

The signal representing the difference $\Delta_2$ (amount of tool offset) between the standard workpiece radial dimension and the workpiece dimension measured by the measuring unit 14 in response to the second measurement instruction appears from the subtractor 30 to be applied to the computing circuit 51. In this case, the value $\Delta_2$ is smaller than $\frac{3}{4}\Delta_o$ which is estimated to be the tool offset value at the time $m_2$ of second measurement. This is because the thermal deformation of the machine tool machining the workpieces is gradually reduced with time. In response to the application of the output signal of the subtractor 30 representing $\Delta_2$, together with the output signal of the OR gate 55 representing the number $n_2$ of workpieces machined, the signal representing the dimension tolerance $\Delta_o$ and the signal representing the constant $\frac{3}{4}$, the computing circuit 51 computer the number $n_3$ of workpieces to be machined up to the time $m_3$ of next measurement. Thereafter, the number of workpieces to be machined up to the time $m_4$ is similarly computed. When the number of workpieces represented by the output value of the computing circuit 51 exceeds the present maximum number of workpieces of, for example, one hundred represented by the reference input signal applied to the comparator 52, the signal representing this preset maximum is delivered now from the comparator 52. Such an output is provided so as to prevent an infinite increase in the measurement interval due to saturation of the thermal deformation of the machine tool.

Figure 5:
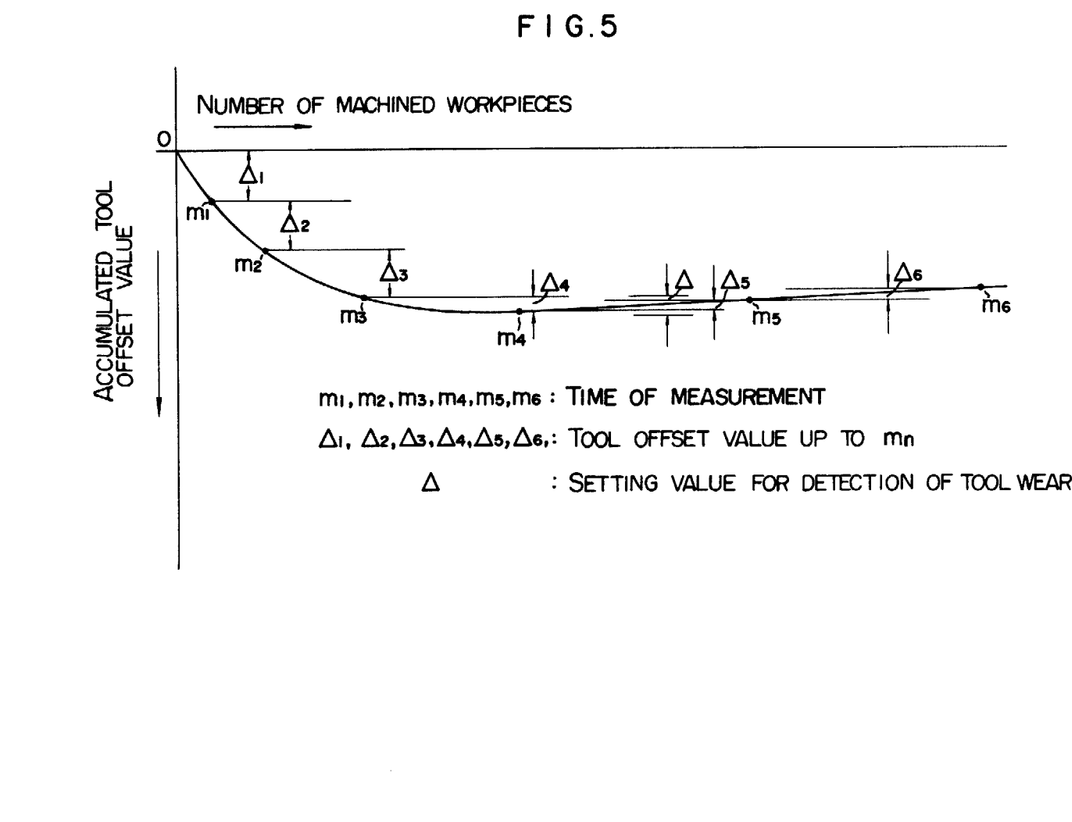
FIG. 5 is a graph showing the relation between the number of machined workpieces and the accumulated amount of tool feed position compensation.

FIG. 5 is a graph showing the relation between the accumulated tool offset value and the number of workpieces to be machined, in the case where the radial deviation of the main spindle of the machine tool is produced in the direction such that the distance between the pointed end of the tool and the axis of the spindle is decreased. In FIG. 5, the symbols $m_1$, $m_2$, . . . , $m_6$ designate the times of measurement, and $\Delta_1$, $\Delta_2$, . . . , $\Delta_6$ designate the tool offset value up to the respective times of measurement $m_1$, $m_2$, . . . , $m_6$. These symbols are the same as those shown in FIG. 4. The symbol $\Delta$ represents a setting value used to determine whether the amount of tool offset computed at each time of measurement is based on the thermal deformation component or the tool wear component. The left-hand portion of the curve of FIG. 5 illustrates that the mechanical deformation due to heat takes place abruptly as soon as the machining is initiated, and the relative distance between the centerline of the (or the axis of the main spindle) workpiece and the cutting edge of the cutting tool is thereby decreased. Therefore, the measured dimension is less than the reference (standard) radial dimension, and in such a state, the tool wear component cannot be derived. However, the number of workpieces machined up to, for example, the time $m_4$ of fourth measurement is negligibly small compared with the total number of workpieces machined until the cutting tool is exchanged, and such workpieces may not be included in the number of workpieces used for seeking the accumulated value of the net tool wear component. In effect, such workpieces have not any substantial influence on the accumulation of the net tool wear component.

At the time $m_4$ of fourth measurement in FIG. 5, the amount of tool feed position compensation $\Delta_4$ is still smaller than the reference setting $\Delta$, and the measured dimension of the workpiece is still less than the reference dimension. Thus, this amount $\Delta_4$ represents the mechanical deformation component due to heat but not the tool wear component. At the time $m_5$ of fifth measurement, the measured dimension of the workpiece tends to exceed the reference dimension, and the amount of tool offset $\Delta_5$ is smaller than the reference setting value $\Delta$ and represents the tool wear component. Thus, when the measured dimension of the workpiece tends to exceed the reference dimension, the amount of tool offset will represent the net tool wear component regardless of its magnitude. In FIG. 5, the left-hand portion of the curve illustrates that the mechanical deformation due to heat occurs in a direction which decreases the relative distance between the centerline of the workpiece and the cutting edge of the cutting tool. However, in the succeeding portion of the curve, the mechanical deformation due to heat occurs in a direction which increases the relative distance between the centerline of the workpiece and the cutting edge of the cutting tool. It is therefore necessary to provide a suitable numerical value so as to separate the tool wear component from the mechanical deformation component due to heat. This numerical value is the setting value $\Delta$. This reference setting value $\Delta$ can be suitably selected to meet the performance of the machine tool.

Figure 6:
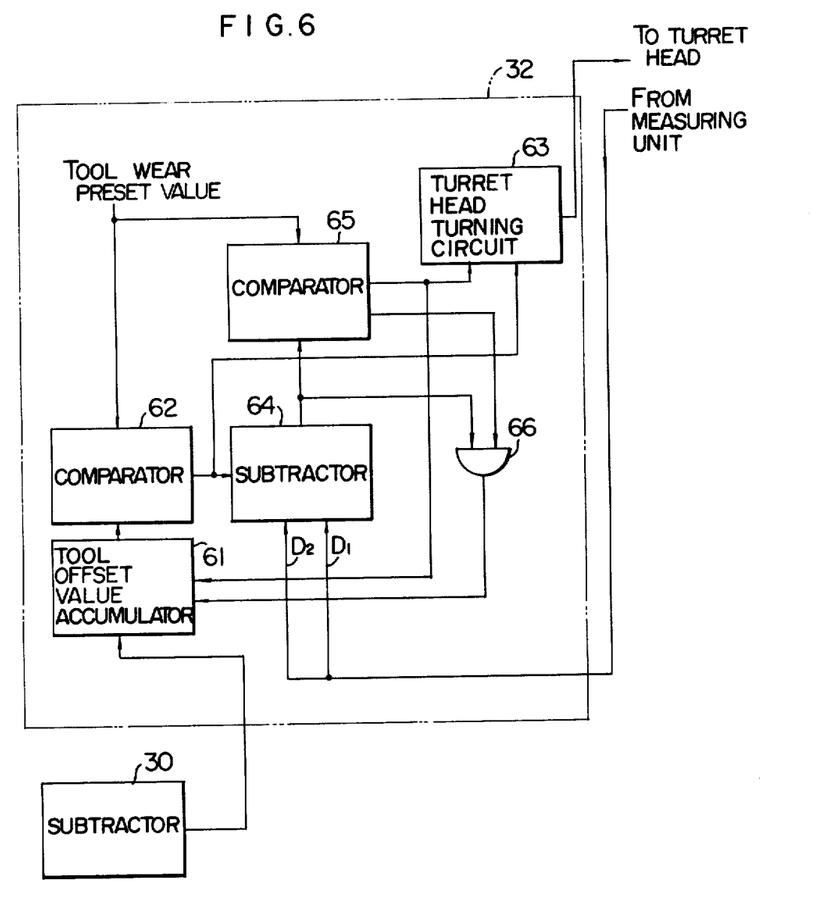
FIG. 6 is a block diagram showing in detail the structure of a second form of the tool life managing unit 32 in FIG. 1.

FIG. 6 is a block diagram showing in detail the structure of a second form of the tool life management unit 32 shown in FIG. 1. Referring to FIG. 6, the output value of the subtractor 30 representing the amount of tool offset is applied to an accumulator 61 which accumulates such an amount. The output value of the accumulator 61 is applied to a comparator 62 to be compared with a value representing a preset value of tool wear. When coincidence is reached between these two input values, the comparator 62 applies an instruction signal to a turret head turning circuit 63 so as to index, to the cutting position, a single reference tool mounted on the turret head 11. This reference tool is used for comparison with the cutting tool having been used up to that time thereby deriving or detecting the net mechanical tool wear component. This reference tool is brought to the cutting position only when it is indexed by the command signal applied from the comparator 62 to the turret head turning circuit 63. The number of times of using this reference tool is very small compared with that of the remaining cutting tools, and therefore, wear on this reference tool is quite negligible.

The manner of detection of the net mechanical tool wear component will be described in further detail. In response to the attainment of coincidence between the two inputs to the comparator 62, a signal representing the measured dimension $D_1$ of the workpiece machined by the cutting tool having been used up to that time is applied from the measuring unit 14 to a subtractor 64. Machining by the reference tool indexed to the cutting position is then carried out, and a signal representing the measured dimension $D_2$ of the machined workpiece is also applied to the subtractor 64, so that an output signal representing $(D_1 - D_2)$ appears from the subtractor 64. This value $(D_1 - D_2)$ represents the net tool wear component obtained by removing the mechanical deformation component due to heat. The output signal of the subtractor 64 representing the value $(D_1 - D_2)$ is applied to a comparator 65 to be compared again with the signal representing the tool wear preset value. When this value $(D_1 - D_2)$ is detected to be smaller than the tool wear preset value, the contents of the accumulator 61 include the mechanical deformation component due to heat. In this case, the output value of the subtractor 64 representing $(D_1 - D_2)$ is applied through an AND gate 66 to the accumulator 61 to renew the contents of the accumulator 61. Machining with the cutting tool is continued until the output signal of the accumulator 61 coincides with the signal representing the tool wear preset value. The reference tool is indexed to the cutting position again when coincidence is reached between the two inputs to the comparator 62. Thus, the cutting tool having been used up to the time of attainment of coincidence between the output signal of the subtractor 64 and the signal representing the tool wear preset value has reached the end of its useful life, and the comparator 65 actuates the turret head turning circuit 63 so as to index the next new cutting tool to the correct cutting position.

As described above, the reference tool is indexed to be brought to the cutting position when the comparator 62 applies the command signal to the turret head turning circuit 63. When, however, the workpiece dimension tolerance $\Delta_o$ is small, direct cutting on the workpiece with the reference tool may sometimes give rise to such a situation that the workpiece will be cut beyond the dimension tolerance $\Delta_o$ to provide a reject. In order to avoid such a situation, the amount of tool offset may be conveniently selected so that the workpiece may be cut to a dimension slightly greater than the reference dimension, and the net tool wear component may be detected in that state. Thereafter, the amount of tool offset may be restored to the original value. In the form shown in FIG. 6 too, the measurement instruction signal instructing measurement by the measuring unit 14 is generated from the measurement instructing unit 33 shown in FIG. 3.

It will be understood from the foregoing detailed description of the present invention that the mechanical deformation component due to heat is removed from the amount of tool offset to detect the net tool wear component instead of merely accumulating the amount of tool offset at each time of measurement. Therefore, the tool life can be managed rationally with desired high precision to permit continuous automatic operation of a machine tool over an extended period of time. Various modifications in structure and/or function may be made by one skilled in the art to the disclosed embodiments without departing from the scope of the invention as defined by the claims.

We claim:

1. An automatic management system for tool life in a numerical machine tool including a tool post, a turret head journaled in said tool post for carrying a plurality of equally circumferentially spaced cutting tools of the same shape having their cutting edges disposed on the same circumference, a chuck releasably grasping a workpiece, a measuring unit responsive to a measurement instructing signal for automatically measuring the radial dimension of the workpiece grasped by said chuck, and means for turning said turret head, said system comprising:

subtracting means for subtracting a signal representing the reference radial dimension of said workpiece from a signal representing the radial dimensions of said workpiece measured by said measuring unit thereby providing an output representing the amount of tool offset;

tool life managing means for removing a radial deviation component due to heat from the amount of tool offset provided by the output of said subtracting means thereby accumulating solely a tool wear component, said tool life managing means actuating the turret head turning means to exchange a fresh one for a used one of said cutting tools when the accumulated value attains a preset value; and     measurement instructing means for applying the measurement instructing signal to said measuring unit at the time determined by the output of said subtracting means.

2. A system as claimed in claim 1, wherein said tool life managing means comprises a first comparator for comparing and generating its output when the output of said subtracting means representing the amount of tool offset obtained by subtracting the reference radial dimension of the workpiece from the radial dimension of the workpiece measured by said measuring unit becomes smaller than a signal representing a setting value $\Delta$, a tool wear value accumulator for accumulating the output of said subtracting means each time said first comparator generates its output, said accumulator being reset when the accumulated value attains the tool wear preset value, and a second comparator comparing the output of said tool wear value accumulator with a signal representing a preset value of tool wear, said second comparator generating its output when coincidence is reached between the two inputs, thereby actuating said turret head turning means for carrying out tool exchange.

3. A system as claimed in claim 1, wherein said tool life managing means comprises a tool offset accumulator accumulating the output of said subtracting means representing the amount of tool offset obtained by subtracting the reference radial dimension of the workpiece from the radial dimension of the workpiece measured by said measuring unit, a first comparator for comparing the output of said tool offset value accumulator with a signal representing a preset value of tool wear, said first comparator generating its output when coincidence is reached between the two inputs thereby instructing indexing of a reference tool fixedly mounted on said turret head, a subtractor for subtracting the radial dimension obtained by cutting with said reference tool indexed in response to the output of said first comparator from the radial dimension of the workpiece obtained by cutting the workpiece with the cutting tool having been used prior to indexing of said reference tool, thereby computing the net tool wear component not including the radial deviation component due to heat, and a second comparator comparing the output of said subtractor representing the tool wear component with the signal representing the preset value of tool wear, thereby replacing the contents of said tool offset value accumulator by the output of said subtractor when coincidence is not reached between the two inputs, said comparator actuating said turret head turning means for said tool exchange when the accumulated value does not exceed the preset value of tool wear.

4. A system as claimed in claim 1, wherein said measurement instructing means comprises a computing circuit for computing the number of workpieces to be machined between one time of measurement and the next time of measurement in response to the application of a signal representing the radial dimension tolerance $\Delta_o$ of the workpieces, a signal representing a constant used to reduce the radial dimension tolerance $\Delta_o$ and a signal representing the number of workpieces machined up to said one time of measurement, in addition to the output of said subtracting means representing the amount of tool offset obtained by subtracting the reference radial dimension of the workpiece from the radial dimension of the workpiece measured by said measuring unit, a first comparator comparing the output of said computing circuit with a signal representing a preset maximum number of workpieces to be machined, the former signal being selectively delivered from said first comparator when the number of workpieces to be machined between said one time of measurement and the next time of measurement is less than the preset maximum, while the latter signal being selectively delivered from said first comparator when the number of workpieces to be machined between said one time of measurement and the next time of measurement exceeds the preset maximum, and a second comparator comparing the output of said first comparator with a signal representing the number of actually machined workpieces thereby applying the measurement instructing signal to said measuring unit when coincidence is reached between the two inputs.

* * * * *